J. L. ZESIGER.

CHECK FOR DOORS, &c.

(Application filed Apr. 30, 1898.)

No. 11,684. Reissued July 26, 1898.

Witnesses,
E. R. Heymann
Jacob Goldberg

Inventor,
John L. Zesiger,
per Geo. W. Tibbitts
Attorney.

THE NORRIS PETERS CO., PHOTO-LITHO., WASHINGTON, D. C.

UNITED STATES PATENT OFFICE.

JOHN L. ZESIGER, OF CLEVELAND, OHIO.

CHECK FOR DOORS, &c.

SPECIFICATION forming part of Reissued Letters Patent No. 11,684, dated July 26, 1898.

Original No. 582,449, dated May 11, 1897. Application for reissue filed April 30, 1898. Serial No. 679,400.

*To all whom it may concern:*

Be it known that I, JOHN L. ZESIGER, a citizen of the United States of America, and a resident of the city of Cleveland, in the county of Cuyahoga and State of Ohio, have invented certain new and useful Improvements in Checks for Doors, Blinds, &c., of which the following is a specification.

My invention relates to an improved check and catch for doors, blinds, shutters, gates, &c.

The objects are to provide a simple, durable, and cheap device of the character indicated; and with this object in view the invention consists in certain features of construction and combinations of parts, substantially as hereinafter described, and pointed out in the claim.

Figure 1:
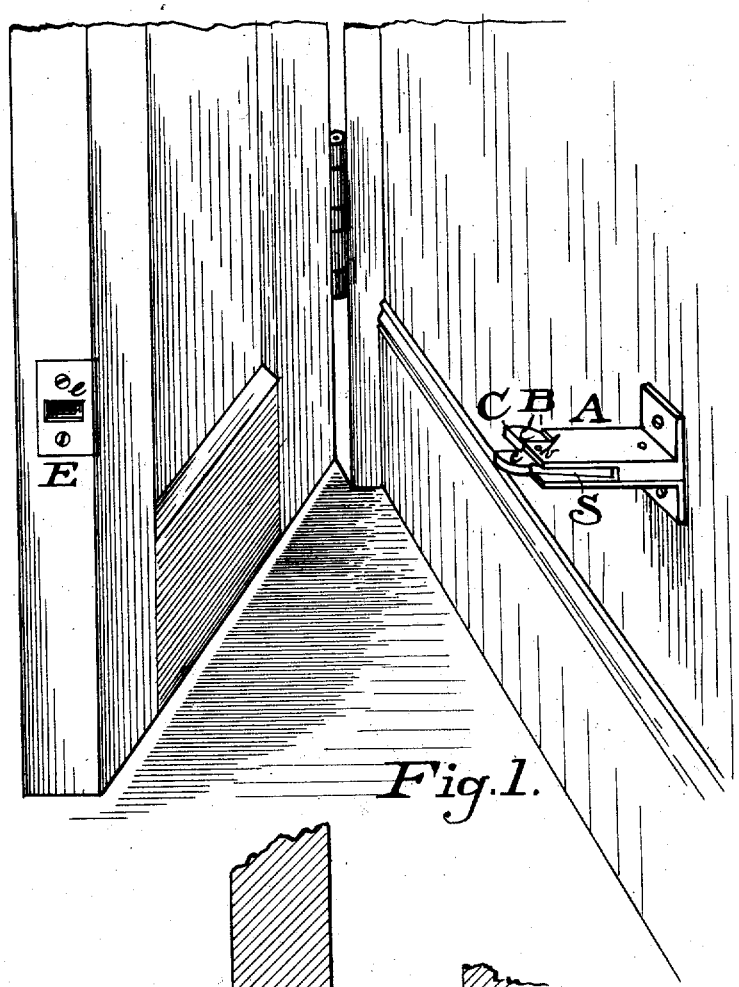
Figure 2:
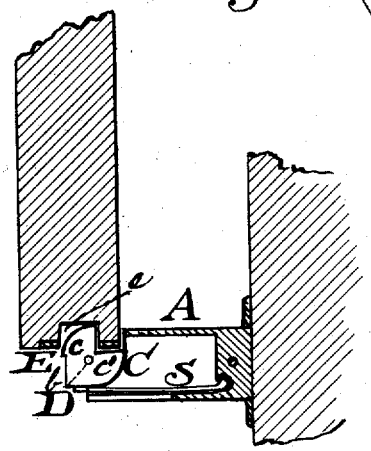

In the accompanying drawings, Figure 1 is a view in perspective of the lower part of a hinged door, blind, or shutter and the adjacent portion of a wall of a room or building against which the door, blind, or shutter swings in opening, and shows my improved check attached to the base-board of the wall, and shows also a keeper catch-plate secured to the door or blind to coöperate with the check. Fig. 2 is a horizontal section of the door and check, showing the door or blind held open by the check. Figs. 3 and 4 are detached views of the rotative or swinging catch or check.

A represents a casing which holds the working parts of my device and is attached to the base-board or wall in such a manner that it will be in a position to meet and engage with the door when thrown open. The said casing is made up of two parallel plates arranged at a suitable distance apart and secured together, and at its forward corner is made a notch or shoulder B, which serves as a stop against which the door strikes and rests when open.

C is a rotative or swinging L-shaped catch centrally pivoted in the forward end of the casing in such a manner that one arm *c* of the catch will extend beyond the end of the casing, while the other arm *c'* extends at a right angle outward from the said notch B.

*b* is a pin put through the casing and swinging member or catch C and upon which said catch turns.

D is a square or nearly square shoulder or heel on the catch C opposite to its L-shaped recess and at a greater distance from the pivot than its side parts, as seen in Figs. 1 and 2, respectively, and is adapted to hold the swinging member or catch in either of the two positions by the pressure of a spring S, bearing against the straight sides of the catch.

E is a keeper or catch plate attached to the door and has a mortise *e* for engagement with the catch C when the door is swung open, as seen in Fig. 2.

The operations of this device are as follows: The normal position of the catch C is that shown in Fig. 1. Now when the door is swung open or around toward the catch the edge or corner of the keeper-plate E strikes against the arm *c'* and turns the catch on its pivot, the spring yielding to the pressure of the heel D, and the arm *c* of said catch enters the mortise *e*.

It will be seen that the spring performs two functions, the first being that the tension of the spring arrests the force of the swinging door and prevents the shock when the door strikes the notch or shoulder B. The second is that the catch C is also held in the keeper-plate by the tension of said spring, and thus the door is held from being swung by wind or other light force, but will yield to the pull on the door for shutting it. The catch and check are therefore automatic in working.

Having described my invention, what I claim, and desire to secure by Letters Patent, is—

A check or catch for doors, blinds, &c., the casing A having the notch or shoulder B, the rotative or swinging L-shaped member or catch C, having heel D, and centrally pivoted in the forward or outward end of said casing, a spring S fixed in said casing and bearing alternately against the sides of said catch, C, and a keeper-plate E to coöperate with said catch C, constructed, combined and adapted to operate substantially as and for the purpose set forth.

JOHN L. ZESIGER.

Witnesses:
GEO. W. TIBBITTS,
LEWIS W. FORD.